United States Patent
Funabashi et al.

(10) Patent No.: US 7,579,807 B2
(45) Date of Patent: Aug. 25, 2009

(54) BATTERY CHARGER

(75) Inventors: Kazuhiko Funabashi, Ibaraki (JP); Nobuhiro Takano, Ibaraki (JP); Kenro Ishimaru, Ibaraki (JP); Takao Aradachi, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 385 days.

(21) Appl. No.: 11/370,944

(22) Filed: Mar. 9, 2006

(65) Prior Publication Data

US 2006/0208699 A1 Sep. 21, 2006

(30) Foreign Application Priority Data

Mar. 11, 2005 (JP) .......................... P 2005-068367

(51) Int. Cl.
*H02J 7/00* (2006.01)
(52) U.S. Cl. .................. 320/106; 320/114; 320/122; 320/137
(58) Field of Classification Search ........... 320/106, 320/114, 122, 137, 148
See application file for complete search history.

(56) References Cited

U.S. PATENT DOCUMENTS 6,100,668 A * 8/2000 Takano ................. 320/148

2002/0060552 A1 * 5/2002 Harada et al. ............... 320/106
2004/0075417 A1 4/2004 Aradachi et al.

FOREIGN PATENT DOCUMENTS

| CN | 1248352 A | 3/2000 |
|---|---|---|
| CN | 1510812 A | 7/2004 |
| JP | 2002199612 | 7/2002 |
| JP | 2003116230 | 4/2003 |
| JP | 2003199259 | 7/2003 |
| JP | 2004-187366 | 7/2004 |
| JP | 2005333708 | 12/2005 |
| WO | 9838720 | 9/1998 |

* cited by examiner

*Primary Examiner*—Adolf Berhane
*Assistant Examiner*—Yalkew Fantu
(74) *Attorney, Agent, or Firm*—Brundidge & Stanger, P.C.

(57) ABSTRACT

A battery charger including a charging power supply circuit connected to an input power supply and adapted to charge a battery to be charged, a charging control circuit adapted to control charging of the battery, and a constant voltage power supply adapted to drive the charging control circuit, wherein the charging control circuit stops an output of the constant voltage power supply when the battery is detached from the charger.

21 Claims, 2 Drawing Sheets

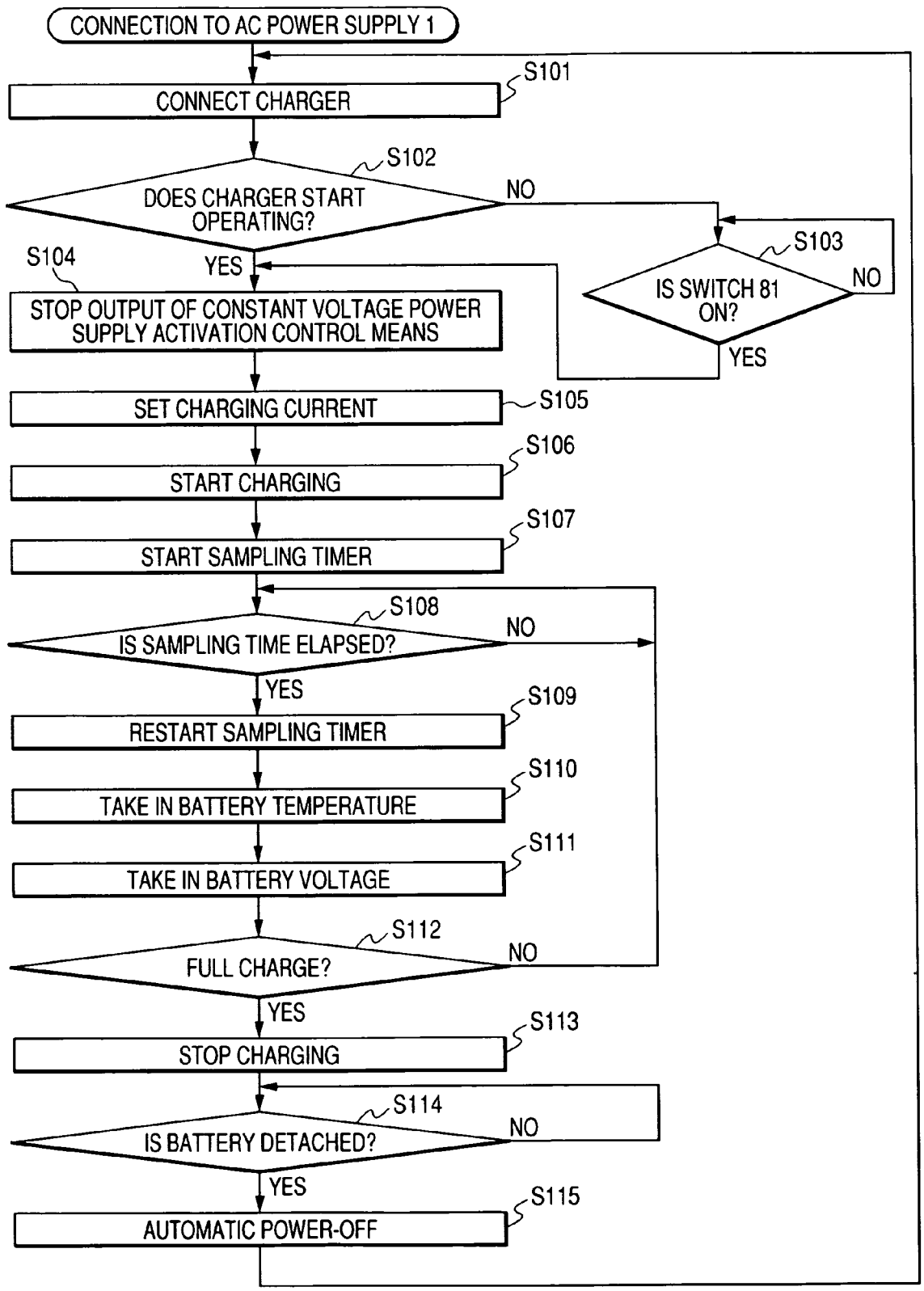

BATTERY CHARGER

BACKGROUND OF THE INVENTION

1. Field of the Invention

The present invention relates to a charger for charging a secondary battery, such as a nickel cadmium battery (a Ni—Cd battery) and a nickel hydride battery (a Ni-MH battery), and, more particularly, to a charger for reducing power consumption in a standby mode in which charging is not performed.

2. Description of the Related Art

High capacity secondary batteries, such as a Ni—Cd battery and a Ni-MH battery, are being widely used as a power supply for portable equipment, such as an electric tool. On the other hand, with increases in the capacity of the secondary battery, increases in the output capacity of a charger for charging such a battery in a short time is proceeding.

A secondary battery charger adapted to reduce power consumption in a standby mode, in which charging is not performed, has been proposed. JP-A-2004-187366 discloses a battery charger adapted so that an output voltage in a standby mode is set to be lower than an output voltage used during charging, thereby to realize low power consumption in a standby mode in which charging is not performed.

However, it is difficult for the related charger to eliminate power consumption in a standby mode. The related charger is insufficient to realize low power consumption in a standby mode.

SUMMARY OF THE INVENTION

Accordingly, an object of the invention is to eliminate the drawbacks of the related art and to extremely reduce the power consumption of a charging apparatus in a standby mode in which charging is not performed.

The above and other objects and novel features of the invention will become more apparent from the following description and the accompanying drawings.

Outlines of the representative aspects of the invention as disclosed herein are described as follows.

(1) According to an aspect of the invention, there is provided a battery charger having a charging power supply means connected to an input power supply and adapted to charge a battery, a charging control means adapted to control charging of the battery, and a constant voltage power supply adapted to drive the charging control means. The battery charger features that the charging control means stops an output of the constant voltage power supply when the battery is detached from the charger.

(2) An embodiment of the battery charger described in the item (1) features that the constant voltage power supply is activated through a circuit operation triggering means by using a residual voltage of the battery when the battery is connected to the charger.

(3) An embodiment of the battery charger described in the item (1) features that the circuit operation triggering means is connected to the constant voltage power supply through a diode.

(4) An embodiment of the battery charger described in the item (2) or (3) features that an output operation of the circuit operation triggering means is stopped by the charging control means after the constant voltage power supply is activated.

(5) An embodiment of the battery charger described in the item (1) features that the constant voltage power supply is activated by the input power supply connected to the charging power supply means through a switch.

(6) An embodiment of the battery charger described in one of the items (1) to (5) features that the charging control means includes a microcomputer, a detected voltage of the battery is inputted to an input port of the microcomputer; and a control signal, which causes an operation of the constant voltage power supply, is outputted from an output port of the microcomputer.

(7) According to another aspect of the invention, there is provided a battery charger having an input power supply, a charging power supply means connected to the input power supply and adapted to supply a voltage and a charging current to a battery to be charged, a charging current control means electrically connected to the charging power supply means and adapted to control a charging current, which is supplied to a battery to be charged, according to a set value, a main control means adapted to supply control signals, according to which the charging power supply means and the charging current control means are controlled, from start of charging the battery to stoppage of charging the battery, and a constant voltage power supply adapted to drive the main control means. This battery charger features that the main control means stops supply of operating power to the main control means by stopping output of an output voltage of the constant voltage power supply when the battery to be charged is not connected to the charging power supply means (8) An embodiment of the battery charger described in the item (7) features that the constant voltage power supply is activated by a circuit operation triggering means adapted to control activation of the constant voltage power supply according to a residual voltage of the battery before charging is started.

(9) An embodiment of the battery charger described in the item (7) features that the constant voltage power supply is activated by the input power supply connected to the charging power supply means through a switch.

(10) An embodiment of the battery charger described in the item (8) features that the main control means stops an operation of the circuit operation triggering means after the constant voltage power supply is activated by an output of the circuit operation triggering means. (11) An embodiment of the battery charger described in one the items (7) to (10) features that the main control means comprises a microcomputer, that a detected voltage of the battery to be charged is inputted to an input port of the microcomputer, and that a control signal, which stops an operation of the constant voltage power supply, is outputted from an output port of the microcomputer.

(12) An embodiment of the battery charger described in one the items (7) to (11) features that input power of the input power supply is outputted from the AC power supply and is rectified through a rectifying circuit.

(13) An embodiment of the battery charger described in one the items (7) to (12) features that the charging power supply means comprise a switching power supply, and the input power supply of switching power supply includes a rectifying circuit.

According to the charger of the invention, when a battery to be charged is not mounted in the charger, a constant voltage power supply is stopped. Thus, power consumption in a standby mode can extremely be reduced.

Also, the supply of operating power from the constant voltage power supply to the charging control means is stopped. The power consumption of the charging control means including the main control means and the charging current control means can be reduced.

BRIEF DESCRIPTION OF THE DRAWINGS

FIG. 2 is a flowchart illustrating an operation of the charger according to the embodiment.

DETAILED DESCRIPTION OF THE PREFFERED EMBODIMENTS

Figure 1:
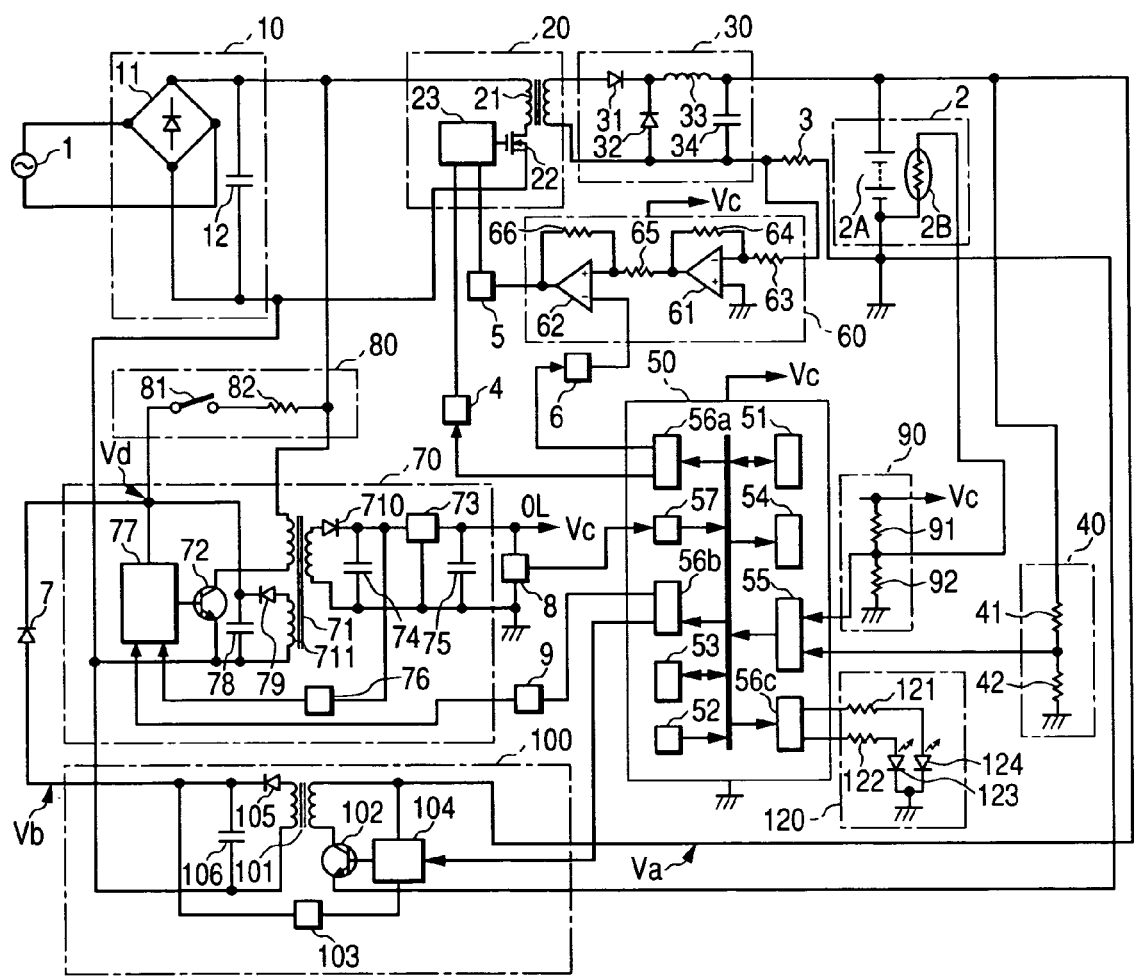
FIG. 1 is a block circuit diagram illustrating a charger according to an embodiment of the invention.

Hereinafter, an embodiment of the invention is described in detail with reference to FIGS. 1 and 2. Incidentally, same reference numerals designate members having the same functions throughout figures illustrating the embodiment. Thus, redundant descriptions of such members are omitted herein.

FIG. 1 is a block circuit diagram illustrating a charger that is an embodiment according to the invention. As shown in FIG. 1, an assembled battery to be charged (hereunder referred to as a "batterypack") 2 includes a plurality of series-connected rechargeable batteries (or cells) 2A and a thermosensitive element 2B, such as a thermistor, placed in contact with or close to the cells 2A. For example, this assembled battery 2 includes cells 2A constituted by eight series-connected Ni—Cd batteries each having about 1.2V. Thus, this assembled battery 2 has about 9.6V.

A charging power supply means for supplying electric power (that is, a charging voltage and a charging current) to the battery 2 to be charged has a first rectifying/smoothing circuit 10, a switching circuit 20, and a second rectifying/smoothing circuit 30. A charging control means for controlling the charging power supply means at the attachment and the detachment of the battery 2 to and from the charger and at the start and the stoppage of charging the battery 2 has a charging current control means 60 and a main control means 50 constituted by a microcomputer.

The first rectifying/smoothing circuit 10 includes a full-wave rectification circuit 11, which is used to perform the full-wave rectification of an AC input from a commercial AC power supply 1, and also includes a smoothing capacitor 12. The switching circuit 20 has a high-frequency transformer (a step-down transformer) 21, a MOSFET (a switching element) 22 series-connected to a primary coil of the transformer 21, and a PWM control IC (a drive signal control means) 23 for modulating the pulse width of a drive pulse signal applied to a gate electrode of the MOSFET 22. The PWM control IC 23 is adapted to control a turn-on time of the MOSFET 22 and adjust an output voltage of the second rectifying/smoothing circuit 30 and a charging current of the battery 2 by changing the pulse width of a drive pulse, which is supplied to the gate electrode of the MOSFET 22, according to a control input signal inputted from a charging current signal transmission means 5. The second rectifying/smoothing circuit 30 includes diodes 31 and 32, a choke coil 33, and a smoothing capacitor 34, which are connected to the secondary coil of the transformer 21. The commercial AC power supply 1 supplies electric power to the first rectifying/smoothing circuit 10.

Thus, the first rectifying/smoothing circuit 10, the switching circuit 20, andthe second rectifying/smoothing circuit 30 constitute the charging power supply means. In a case where a 100V AC power supply is used in this charging power supply means, the value of a voltage to be applied is changed by the first rectifying/smoothing circuit 10. With this configuration, the voltage obtained from the first rectifying/smoothing circuit 10 is about 140V, while the voltage obtained from the first rectifying/smoothing circuit 30 is about 35V.

The charging current control means 60 is electrically connected to the charging power supply means including the first rectifying/smoothing circuit 10, the switching circuit 20, and the second rectifying/smoothing circuit 30. The charging current control means 60 includes an operation amplifying circuit that comprises operational amplifiers 61 and 62, input resistors 63 and 65 and feedback resistors 64 and 66.

An input terminal of this charging current control means 60 is connected to a detection resistor 3 for detecting a charging current of the battery 2. An output terminal of the charging current control means 60 is electrically connected to the PWM control IC 23 through the charging current signal transmission means 5. A charging current setting means 6 is connected to the inverting input terminal of the second-stage operational amplifier 62. The charging current setting means 6 is used to set the magnitude of a charging current in response to a control signal outputted from an output port 56a of the microcomputer 50 described below.

A main control circuit means comprises a microcomputer 50. The microcomputer 50 includes the function blocks of a central processing unit (CPU) 51 adapted to execute a control program, a read-only memory (ROM) 52 adapted to store a control program for the CPU 51, a random access memory (RAM) 53 used as a work area for the CPU 51 and as a temporary storage area, a timer 54, an A/D converter 55 for converting analog signals, such as a detection signal representing a charging voltage of the assembled battery (the battery pack) 2 and a detection signal representing a temperature of the assembled battery 2, to digital signals, the output port 56a for outputting a control signal, an output port 56b for outputting a deactivating signal to a circuit operation triggering means 100 and a constant voltage power supply 70 which are described below, and a resetting input port 57 for inputting a reset signal in a case where electric power is supplied from the constant voltage power supply 70. These function blocks are connected to one another by internal buses. For example, the CPU 51 computes the gradient of a battery temperature with respect to time according to data representing the latest battery temperature, which is stored in the RAM 53, and to a plurality of data representing the battery temperature, which is stored in the RAM 53 and is sampled every sampling period.

The voltage of the assembled battery 2 is detected by a battery voltage detection means 40, which includes voltage dividing resistors 41 and 42, and is inputted to the A/D converter 55 of the microcomputer 50.

The temperature of the assembled battery 2 is detected in terms of a divided voltage, which varies with change in temperature, by connecting the thermo sensitive element 2B, which is provided in the assembled battery 2, to a battery temperature detecting means 90, which includes resistors 91 and 92 series-connected to a 5V constant voltage power supply. This detected voltage is inputted to the A/D converter 55 of the microcomputer 50.

A signal instructing the start or the stoppage of charging the (assembled) battery 2 is supplied to a control input terminal of the PWM control IC 23 from the output port 56a of the microcomputer 50 through a charging control signal transmission means 4 according to the control program executed by the microcomputer 50. The switching circuit 20 controls the start or the stoppage of charging according to the control signal outputted from the charging control signal transmission means 4.

According to the invention, electric power (Vc) or bias electric power for the microcomputer 50, the charging current control means 60, and the battery temperature detection means 90 is supplied through the output line OL of the constant voltage power supply 70. This constant voltage power supply 70 has a transformer 71, a switching transistor 72, whose collector is connected to the primary coil of the transformer 71, an operating voltage supply circuit including a rectifying diode 79 and the smoothing capacitor 78, which are connected to an auxiliary coil 711 of the transformer 71, and a constant voltage control means (a base drive control means) 77 connected to the base terminal of the switching transistor 72. The constant voltage power supply 70 also has a power output circuit, which includes a rectifying diode 710, smoothing capacitors 74 and 75, and a three-terminal regulator 73, and which is connected to a secondary coil of the transformer 71. During operation, the constant voltage power supply 70 outputs a voltage Vc to the output line OL. An operating voltage Vd is supplied to the constant voltage control means 77. Especially, at activation time, this voltage Vd is transiently supplied thereto as a trigger voltage from the circuit operation triggering means 100, which is described below, or the first rectifying/smoothing circuit (or input power supply circuit) 10 through a trigger switch circuit 80 described below. After the activation, a voltage generated by the constant voltage power supply 70 itself is used as the operating voltage Vd.

The operating voltage Vd is supplied from the operating voltage supply circuit to the constant voltage control means 77. However, at the start of charging, the constant voltage power supply 70 does not operate, so that the operating voltage Vd is not generated. Thus, a voltage is applied to the constant voltage control means 77 from the circuit operation triggering means (the trigger voltage power supply) 100 described below or the first rectifying/smoothing circuit (the input power supply circuit) 10 through the trigger switch circuit 80 described below. Thus, the constant voltage power supply 70 is activated.

When the circuit operation triggering means 100 or the trigger switch circuit 80 supplies a voltage to the constant voltage control means 77 as the operating voltage Vd, the constant voltage control means 77 starts controlling the transistor 2 to perform a switching operation, according to a voltage that is transmitted by a constant voltage signal transmission means 76 so that the voltage developed across the capacitor 74 is a predetermined voltage.

When a switching operation is once started by the switching transistor 72, the operating voltage Vd is fed back by the operating voltage supply circuit comprising the rectifying diode 79 and the smoothing capacitor 78, which is formed at the side of the auxiliary coil 711 of the transformer 71. Thus, the constant voltage control means 77 causes the transistor 72 to perform a switching operation even when the application of the trigger voltage from the circuit operation triggering means 100 or from the first rectifying/smoothing circuit (the input power supply circuit) through the trigger switch circuit 80 is stopped.

On the other hand, the voltage rectified through the diode 710 at the side of the secondary coil side of the transformer 71 is fed back to the constant voltage control means 77 through the constant voltage signal transmission means 76. An output voltage of the constant voltage control means 77 is controlled to have a predetermined pulse width. A switching operation of the switching transistor 72 according to this causes the power supply output circuit provided at the secondary coil of the transformer 71 to output a predetermined constant voltage Vc to the output line OL. This voltage Vc is, for example, 5V. The power supply output circuit has the rectifying diode 710, the smoothing capacitors 74 and 74, and the three-terminal regulator 73

According to the invention, the output voltage Vc on the output line OL of the constant voltage power supply 70 is supplied to the microcomputer 50, the charging current control means 60, and the battery temperature detection means 90 as the operating power supply voltage or the bias voltage. A resetting IC 8 is connected to the output line OL of the constant voltage power supply 70. When an operating power supply voltage Vc is supplied to the microcomputer 50 through the output line OL from the constant voltage power supply 70, the resetting IC 8 outputs a reset signal to the input port 57 of the microcomputer 50 to thereby reset the microcomputer 50 to an initial state.

An automatic power-off signal outputted from the output port 56b of the microcomputer 50 is inputted to the constant voltage control means 77 of this constant voltage power supply 70 through the automatic power-off signal transmission means 9. When the battery 2 reaches full charge, so that the battery pack 2 is removed from the charger, an automatic power-off signal is inputted to the constant voltage control means 77 from the microcomputer 50. Consequently, a constant voltage output operation of the constant voltage power supply 70 is stopped. Thus, the supply of the operating voltage (Vc) of the microcomputer 50 is stopped, so that an operation of the entire charger is completely stopped.

According to the invention, the trigger switch circuit 80 is provided in association with the constant voltage power supply 70. The trigger switch circuit 80 comprises a switch 81 and a resistor 82, and transiently supplies a trigger voltage as a power supply voltage Vd. Normally, the switch 81 is in an off-state, unless externally turned on. That is, the switch 81 is a normally-open switch and is temporarily turned on when the constant voltage power supply 70 is activated by transiently supplying the trigger voltage Vd to the constant voltage control means 77.

According to the invention, the circuit operation triggering means 100 serving as another trigger generating means is provided in association with the constant voltage power supply 70. The circuit operation triggering means 100 has a transformer 101, a transistor 102 and a constant voltage control means 104, which are connected to the primary coil of the transformer 101, a rectifying circuit that comprises a rectifying diode 105 and a smoothing capacitor 106, which are connected to the secondary coil of the transformer 101, and a feedback voltage transmission means 103 adapted to feedback an output voltage of the rectifying diode 105 to the constant voltage control means 104. This circuit operation triggering means 100 constitutes a trigger voltage power supply.

The constant voltage control means 104 is constituted by a pulse generating circuit, similarly to the constant voltage control means 77. When the battery (or the battery pack) 2 is mounted in the charger, the residual voltage Va of the battery 2 is supplied as an operating power supply voltage for each of the constant voltage control means 104 and the switching transistor 102. That is, the residual energy of the battery 2 causes the constant voltage control means 104 to start operating. The constant voltage control means 104 controls, for instance, the pulse width of the generated pulse voltage according to the voltage fed back by the feedback voltage transmission means 103 so that a predetermined voltage Vb is developed across the smoothing capacitor 106. Also, the constant voltage control means 104 causes the transistor 102 to perform a switching operation. Consequently, the constant voltage Vb is outputted across the capacitor 106 of the circuit operation triggering means 100. That is, the circuit operation triggering means 100 is of the DC-DC converter type that converting the residual voltage of the battery 2 to a predetermined voltage.

Also, the constant voltage control means 104 has the functions of stopping a switching operation of the transistor 102 in response to a stop signal outputted form the output port 56*b* of the microcomputer 50 to thereby set the output voltage of the circuit operation triggering means 100 to 0 or interrupt the output voltage of the circuit operation triggering means 100.

According to the invention, the output voltage Vb of the circuit operation triggering means 100 is temporarily supplied to the constant voltage control means 77 through a trigger supply means 7 as the trigger voltage Vd. In the embodiment of the invention, this trigger supply means 7 is constituted by a diode. When the constant voltage control means 77 is activated, the diode 7 is conducted and supplies the trigger voltage Vb to the constant voltage control means 77. However, when the constant voltage control means 77 is put into a stationary operation state, so that the feedback voltage Vd generated by a diode 79 is higher than the trigger voltage Vb at an initial stage of the activation, the diode 79 is brought into a reverse-biased state and is nonconducted. Consequently, the advantage of use of the diode 7 is that the diode 79 has the function of electrically separating the circuit operation triggering means 100 from the constant voltage power supply 70, that is, the function of supplying the output voltage Vb of the circuit operation triggering means 100 to the constant voltage control means 77 as a transient trigger voltage Vd.

When a charging operation is started by mounting the battery 2 in the charger, the circuit operation triggering means 100 transiently supplies the trigger voltage Vb to the constant voltage control means 77 to thereby activate the constant voltage power supply 70. Consequently, the operation to subsequently be performed by the circuit operation triggering means 100 becomes unnecessary. If the operation of the circuit operation triggering means 100 continues during charging, there is little influence on the charging operation. However, wasteful power consumption is caused. According to the invention, as described above, after the constant voltage power supply 70 is activated, a stop signal is transmitted from the output port 56*b* of the microcomputer 50 to the constant voltage control means 104. Thus, the switching operation of the transistor 102 is stopped. Thus, the output voltage Vb of the circuit operation triggering means 100 is set to be 0 or is interrupted. Consequently, a lower power consumption charger can be realized.

In the foregoing description of the embodiment, the charger has been described, which has the trigger supply means for the constant voltage power supply 70, respectively, corresponding to two circuit systems used in the case where the output voltage Vb of the circuit operation triggering means 100 is supplied thereto through the diode 7 as the trigger voltage, and used in the case where the trigger voltage is supplied thereto from the input power supply 10 of each of the charging power supply means 10, 20, and 30 through the trigger switch circuit 80. However, in the case where the constant voltage power supply 70 is activated by utilizing only the residual voltage (or energy) of the battery 2 to be charged, it is unnecessary to mount the trigger switch circuit 80 in the charger. Conversely, the mounting of the circuit operation triggering means 100 is unnecessary for the charger, which is exclusively used to charge the battery, the residual voltage (or energy) of which cannot be utilized. The aforementioned embodiment is advantageous in that the charger can be utilized in both of the cases where the residual voltage (or energy) of the battery 2 to be charged is utilized, and where the residual voltage of the battery 2 cannot be utilized (that is, the residual voltage is substantially 0).

The aforementioned embodiment is configured so that the circuit system at the side of the rectifying circuit for rectifying electric power supplied from the AC power supply 1, and the circuit system at the side of the battery 2 to be charged are insulated. Thus, the circuit operation triggering means 100 is configured to be of the insulated DC-DC converter type using the transformer 101. However, the circuit operation triggering means 100 of the charger according to the invention is not limited thereto. In a case where the insulation is unnecessary, the circuit operation triggering means 100 may be configured to be of the non-insulated simplified DC-DC converter type. Further, in a case where the conversion for obtaining a predetermined voltage used as the trigger voltage Vd is unnecessary, the (residual) voltage of the battery 2 to be charged may be used as the output voltage without mounting the special circuit operation triggering means 100 in the charger. In each case, in a stationary operation state, the operating power supply voltage Vd of the constant voltage control means 77 meets the following inequality: Vd>Vb, so that the diode 7 is put into a nonconducted state. Consequently, the DC-DC converter or the battery 2 to be charged is electrically separated from the constant voltage power supply 70.

A monitor circuit 120 is provided to indicate to users the operating condition of the charger, that is, whether charging is being performed, and whether charging is completed. This monitor circuit 120 has a red light emitting diode (LED) 123 and a green light emitting diode (LED) 124, and also has resistors 122 and 121 that limit electric currents flowing in the LEDs 123 and 124, respectively. The turn-on of each of the red LED 123 and the green LED 124 is controlled according to an output from the output port 56*c* of the microcomputer 50. For example, the indication "UNDER CHARGING" is displayed by turning on the green LED 124. The indication "CHARGING COMPLETED" is displayed by turning on the red LED 123. In a case where the charger does not operate because the residual voltage of the battery 2 to be charged is low, both of the LEDs 123 and 124 are prevented from turning on. Especially, in a case where neither the LED 123 nor the LED 124 is turned on, a user can activate the charger by temporarily turning on the normal-open switch 81 of the trigger switch circuit 80, as described below. Thus, the user can grasp the operating condition of the charger by the monitor circuit 120. This monitor circuit 120 may be constituted by using display devices other than LEDs.

FIG. 2 is a flowchart illustrating a user's operations and an operation of the charger shown in FIG. 1. An example of an operation of the charger is described below with reference to the flowchart shown in FIG. 2.

First, the charger is connected to the AC power supply 1. Even when AC power 1 is supplied to the charger, the trigger switch circuit 80 is in a normally open state. Thus, the trigger voltage is not applied to the constant voltage control means 77. The constant voltage control means 77 is not activated. Therefore, the constant voltage power supply 70 does not operate. The power supply voltage Vc is not generated on the output line OL.

In step S101, the battery 2 to be charged (the battery pack 2) is connected to the charger connected to the AC power supply 1.

In step S102, the user sees the indication by the monitor 120 and judges whether the (residual) voltage of the battery 2 is equal to or higher than a predetermined value.

In step S102, it is judged that the battery 2 has a residual voltage (YES), the circuit operation triggering means 100 operates simultaneously with the connection of the battery 2 to the charger, and outputs the power supply voltage Vb. The power supply voltage Vd of the constant voltage control means 77 is transiently supplied to the constant voltage power supply 70 through the diode 7 to thereby cause the constant voltage power supply 70 to start. When the constant voltage power supply 70 is once activated and a stationary operation is started, the power supply voltage Vd of the constant voltage control means 77 is supplied from winding 711 of the transformer 71 through the diode 79 and the smoothing capacitor 78 and is higher than the trigger voltage Vb. In such a stationary operation state, as described above, the power supply voltage Vd of the constant voltage control means 77 is higher than the trigger voltage Vb. The supply of the trigger voltage Vb from the circuit operation triggering means 100 is unnecessary. The constant voltage power supply 70 is in a stationary operation state, and supplies the power supply voltage Vc to the microcomputer 50, the charging current control circuit means 60, the resetting IC 8, and so on. Simultaneously with the supply of this power supply voltage Vc, the reset signal is inputted to the input port 57 from the resetting IC 8. The microcomputer 50 starts operating according to a charging program stored in the ROM 52.

If the user sees the indication by the LEDs 123 and 124 and judges in step S102 that the charging of the battery 2, which utilizes the residual voltage, is not started (NO in step S102), the process proceeds to step S103, whereupon the switch 81 of the trigger switch circuit 80 is temporarily turned on. When the switch 81 is turned on, the starting voltage Vd is supplied to the constant voltage control means 77 from the first rectifying/smoothing circuit 10 through the switch 81 and the resistor 82. Similarly to the activation utilizing the residual voltage of the battery pack 2, the constant voltage power supply 70 starts operating. When the operation of the constant voltage power supply 70 is started, the power supply voltage Vd of the constant voltage control means 77 is supplied from the coil 711 of the transformer 71 through the diode 79 and the smoothing capacitor 78. Thus, the constant voltage power supply 70 is brought into a stationary operation state, and outputs the voltage Vc to the output line OL.

Subsequently, the process proceeds to step S104, whereupon the microcomputer 50, to which the power supply voltage Vc is supplied, outputs an operation stop signal to the constant voltage control means 104 of the circuit operation triggering means 100 from the output port 56b to thereby stop the operation of the constant voltage control means 104. Also, the operation of the circuit operation triggering means 100 is stopped. Consequently, wasteful power consumption of the circuit operation triggering means 100, whose operation is unnecessary, can be eliminated.

In step S105, the microcomputer 50 outputs a control signal from the output port 56a to start charging by using a predetermined charging current. Thus, the microcomputer 50 provides a reference voltage, which is used to set a charging current, to the charging current setting means 6.

In step S106, a charging start signal, which causes the start of charging by using a predetermined charging current, is outputted from the output port 56a of the microcomputer 50, and is inputted to the PWM control IC 23 through the charging control signal transmission means 4 to thereby bring the PWM control IC 23 into an operating state. At that time, the charging current setting means 6 controls the operational amplifier 62 by using the charging current setting reference voltage given thereto. The charging current control means 60 controls the charging current of the battery 2 according to the reference voltage, which is supplied to the operational amplifier 62, to have a predetermined value. Simultaneously with the start of charging, a charging current flowing through the battery 2 is detected by the current detecting means 3. A difference signal representing the difference between the detected voltage and the charging current setting reference value is amplified by using the charging current control means 60. The amplified signal is fed back to the PWM control IC 23 through the charging current signal transmission means 5. Consequently, the pulse width of the drive pulse signal generated by the PWM control IC 23 is modulated according to the magnitude of the difference signal. Consequently, the switching element 22 supplies a pulse voltage (or current) having a narrow pulse width to the high-frequency transformer 21 in a case where the charging current of the battery 2 is large. Conversely, the switching element 22 supplies a pulse voltage (or current) having a wide pulse width to the high-frequency transformer 21 in a case where the charging current of the battery 2 is small. The pulse voltage is then smoothed by the second rectifying/smoothing circuit 30, so that the charging current of the battery 2 to be charged is maintained at a constant value. That is, the current detecting means 3, the charging current control means 60, the charging current signal transmission means 5, the switching circuit 20, and the second rectifying/smoothing circuit 30 constitutes a feedback circuit. The charging current of the battery pack 2 is controlled to have a predetermined value.

After starting the charging, the process proceeds to step S107, whereupon the microcomputer 50 starts a sampling timer to take in data representing the battery voltage under the charging, which is detected by the battery voltage detecting means 40, and also take in data representing the battery temperature, which is detected by the battery temperature detecting means 90, in a certain time.

In step S108, it is judged whether the sampling timer started in step S107 detects a lapse of a predetermined time. If YES, that is, if it is judged that the predetermined time has elapsed, the sampling timer is started again in step S109.

Subsequently, in step S110, the voltage outputted from the thermosensitive element 2B is divided by using the voltage dividing resistors 91 and 92 of the battery temperature detecting means 90. The divided value is A/D-converted by the A/D converter 55. Then, data representing the battery temperature is taken into the microcomputer 50.

Subsequently, the process proceeds to step S111, whereupon the battery voltage of the battery pack 2 under charging is divided by using the voltage dividing resistors 41 and 42 of the battery voltage detecting means 40. The divided value is A/D-converted by the A/D-converter 55. Then, data representing the battery voltage is taken into the microcomputer 50. The data representing the battery temperature and the battery voltage are stored in the RAM 53 of the microcomputer 50 corresponding to each sampling time and are used to perform a full charge process in the next step 112.

In step S112, it is judged whether the battery pack 2 reaches full charge. Various known methods can be employed as a method of determining whether the battery 2 reaches full charge. An example of such known methods is a "−ΔV detection" method of detecting according to an output of the battery voltage detecting means 40 that the battery voltage drops by a predetermined amount from a peak voltage at the end of charging. Also, the following known methods can be employed. That is, one of such methods is a "second order differential" method of obtaining a second-order time differential of change in the battery voltage and of starting charging by detecting that the value of the second-order time differential becomes negative, thereby to stop charging before the battery voltage reaches a peak value. Another of such methods is a "ΔT detection" method of controlling charging by detecting the rate of increase in the temperature of the assembled battery 2 since the start of charging according to the output of the battery temperature detecting means 90 and by detecting that the rate of increase is equal to or higher than a predetermined rate thereof. Also, still another of such methods is a "dT/dt detection" method of controlling charging by detecting the rate of increase in the battery temperature (temperature gradient) per predetermined time at charging and by detecting that the rate of increase in the battery temperature is equal to or higher than a predetermined value. The "dT/dt detection" method is described in JP-A-62-193518, JP-A-2-246739, JP-A-3-34638, and JP-A-2001-169473. The techniques described therein can be employed in the apparatus and the method according to the invention.

If it is judged in step S112 that the battery pack 2 reaches full charge (YES in step S112), the process proceeds to step S113, whereupon the microcomputer 50 transmits a charging stop signal to the PWM control IC 23 from the output port 56b through the charging control signal transmission means 4.

Subsequently, the process advances to step S114, whereupon it is determined whether the battery pack 2 is detached from the charger. The detachment of the battery can be detected by, for instance, the battery voltage detection means 40, or the battery temperature detection means 90.

If it is determined that the battery pack 2 is detached, the process proceeds to step S115, whereupon the microcomputer 50 stops the operation of the constant voltage control means 77 by transmitting a charging stop signal from the output port 56b through the automatic power-off signal transmission means 9. When the constant voltage control means 77 stops operating, the constant voltage power supply 70 also stops operating. The output voltage Vc on the output line OL becomes zero. Therefore, the microcomputer 50, the charging current control means 60, and the battery temperature detecting means 90, which use the output of the constant voltage power supply 70 as power supply therefor, are completely stopped. Also, no voltages are generated in the winding 711 of the transformer 71. The supply of electric power to the constant voltage control means 77 is stopped. That is, the operation of the charger is stopped. The power consumption can extremely be reached.

As is apparent from the foregoing description, according to the invention, in a case where the operation of the charger is completely stopped, that is, in a case where the standby power consumption is zero, the battery pack, which is the battery to be charged, is charged by using the residual energy thereof to restore the normal operation state from the standby state of the charger. Then, upon completion of charging, the battery pack is taken out of the charger, so that the operation of the charger is stopped, and that the standby power consumption can be reduced to zero. Also, according to the invention, in a rare case where a battery pack having completely no residual energy is charged, the normal operation state of the charger can be restored from the standby state by using a simple switch circuit. Consequently, the standby power consumption can extremely be reduced.

Although the invention accomplished by the present inventors has concretely been described according to the embodiments, the invention is not limited to the aforementioned embodiments. Various modifications may be made without departing the gist of the invention.

What is claimed is:

1. A battery charger comprising:
   an Alternating Current (AC) power supply;
   a first rectifier smoothing circuit for rectifying and smoothing the AC voltage;
   a switching circuit connected across output terminals of the first rectifier smoothing circuit to provide pulse signals;
   a second rectifier smoothing circuit for rectifying and smoothing the pulse signals, an output voltage of the second rectifier smoothing circuit being applied to a battery to be charged;
   a charging current control unit that detects a charging current flowing through the battery and controls the charging current in accordance with a charging current set value;
   trigger means connected across the battery to be charged for generating a first trigger voltage based on a residual voltage of the battery when the battery is connected to the charger;
   constant voltage generating means connected to the trigger means to receive the first trigger voltage and adapted to generate a constant voltage which is applied to the charging current control unit as an operating voltage thereof; and
   a microcomputer that detects if the battery is connected to the charger and applies a control signal to the constant voltage generating means to stop supplying the operation voltage to the charging current control unit when the battery is detached from the battery charge.

2. The battery charger according to claim 1, which further comprises:
   a trigger switch circuit connected between the first rectifier smoothing circuit and the constant voltage generating means to apply a second trigger voltage to the constant voltage generating means.

3. The battery charger according to claim 1, wherein the trigger means is connected to the constant voltage generating means through a diode.

4. The battery charger according to claim 1, wherein the first trigger voltage of the trigger means is stored to generate by the microcomputer after the constant voltage generating means is activated by the trigger means.

5. The battery charger according to claim 2, wherein the constant voltage generating means is activated by the second trigger voltage which is supplied from the first rectifier smoothing circuit through a switch.

6. A battery charger comprising:
   an Alternate Current (AC) power supply;
   charging power supply means connected to the input power supply and adapted to supply a voltage and a charging current to a battery;
   charging current control means electrically connected to the charging power supply means and adapted to control the charging current based on a set value;
   main control means adapted to supply the set value to the charging current control means;
   a circuit operation triggering means connected across the battery to be charged for generating a first trigger voltage based on a residual voltage of the battery when the battery is connected to the charger; and
   a constant voltage power supply connected to the circuit operation triggering means to receive the first trigger voltage and adapted to generate a constant voltage which is applied to the charging current control means and the main control means as an operating voltage thereof,
   wherein the main control means detects if the battery is connected to the charger and applies a control signal to the constant voltage power supply to stop supplying the operation voltage when the battery is detached from the battery charger.

7. The battery charger according to claim 6, wherein the constant voltage power supply is connected to the charging power supply means through a switch to receive a second trigger voltage.

8. The battery charger according to claim 7, wherein the first trigger voltage of the circuit operation triggering means is stopped to generate by the main control means after the constant voltage power supply is activated by the circuit operation triggering means.

9. The battery charger according to claim 6, wherein the main control means comprises:
   a microcomputer;
   wherein a detected voltage of the battery is input to an input port of the microcomputer; and
   wherein a control signal, which causes an operation of the constant voltage power supply, is output from an output port of the microcomputer.

10. The battery charger according to claim 7, wherein the main control means comprises a microcomputer;
    wherein a detected voltage of the battery is input to an input port of the microcomputer; and
    wherein the control signal, which causes an operation of the constant voltage power supply based on the detected voltage, is output from an output port of the microcomputer.

11. The battery charger according to claim 8, wherein the main control means comprises a microcomputer;
    wherein a detected voltage of the battery is input to an input port of the microcomputer; and
    wherein the control signal, which causes an operation of the constant voltage power supply based on the detected voltage, is output from an output port of the microcomputer.

12. The battery charger according to claim 6, wherein input power of the input power supply is output from the AC power supply and is rectified through a rectifying circuit.

13. The battery charger according to claim 7, wherein input power of the input power supply is output from the AC power supply and is rectified through a rectifying circuit.

14. The battery charger according to claim 8, wherein input power of the input power supply is output from the AC power supply and is rectified through a rectifying circuit.

15. The battery charger according to claim 9, wherein input power of the input power supply is output from the AC power supply and is rectified through a rectifying circuit.

16. The battery charger according to claim 6, wherein the charging power supply means comprises a switching power supply; and
    wherein the input power supply of switching power supply includes a rectifying circuit.

17. The battery charger according to claim 7, wherein the charging power supply means comprises a switching power supply; and
    wherein the input power supply of switching power supply includes a rectifying circuit.

18. The battery charger according to claim 8, wherein the charging power supply means comprises a switching power supply; and
    wherein the input power supply of switching power supply includes a rectifying circuit.

19. The battery charger according to claim 7, wherein the charging power supply means comprises a switching power supply; and
    wherein the input power supply of switching power supply includes a rectifying circuit.

20. The battery charger according to claim 8, wherein the charging power supply means comprises a switching power supply; and
    wherein the input power supply of switching power supply includes a rectifying circuit.

21. The battery charger according to claim 9, wherein the charging power supply means comprises a switching power supply; and
    wherein the input power supply of switching power supply includes a rectifying circuit.

* * * * *